(12) United States Patent
Nattudurai et al.

(10) Patent No.: US 11,801,531 B2
(45) Date of Patent: Oct. 31, 2023

(54) INTEGRATED SEPARATOR

(71) Applicant: FLSmidth A/S

(72) Inventors: Mathanraj Nattudurai, Chennai (IN); Arun Mangala Prakash Appadurai, Chennai (IN)

(73) Assignee: FLSmidth A/S

( * ) Notice: Subject to any disclaimer, the term of this patent is extended or adjusted under 35 U.S.C. 154(b) by 55 days.

(21) Appl. No.: 17/616,403

(22) PCT Filed: Jun. 4, 2020

(86) PCT No.: PCT/IB2020/055284
§ 371 (c)(1),
(2) Date: Dec. 3, 2021

(87) PCT Pub. No.: WO2020/245768
PCT Pub. Date: Dec. 10, 2020

(65) Prior Publication Data
US 2022/0241821 A1 Aug. 4, 2022

(30) Foreign Application Priority Data

Jun. 4, 2019 (DK) .......................... PA 2019 70361

(51) Int. Cl.
*B07B 9/02* (2006.01)
*B07B 7/083* (2006.01)
(Continued)

(52) U.S. Cl.
CPC ................ *B07B 7/083* (2013.01); *B07B 7/04* (2013.01); *B07B 7/10* (2013.01); *B07B 9/02* (2013.01)

(58) Field of Classification Search
CPC .. B07B 7/083; B07B 7/04; B07B 7/10; B07B 9/02; B07B 7/086; B01D 45/00;
(Continued)

(56) References Cited

U.S. PATENT DOCUMENTS

| 382,948 A | 5/1888 | Bruce |
| 3,190,058 A * | 6/1965 | Farr ........................ F02M 35/08 |
| | | 55/498 |

FOREIGN PATENT DOCUMENTS

| CN | 106975609 A * | 7/2017 |
| CN | 106975609 A | 7/2017 |

(Continued)

OTHER PUBLICATIONS

International Search Report and Written Opinion dated Jul. 27, 2020, 8 pages.

*Primary Examiner* — Gene O Crawford
*Assistant Examiner* — Muhammad Awais
(74) *Attorney, Agent, or Firm* — Jeffrey A. Sharp (57) ABSTRACT

The invention relates to an integrated separator (1) for separating coarse and fine particles in a cement making process, said integrated separator (1) comprising a static separator (2) and dynamic separator (3), said dynamic separator (3) being arranged in an uppermost position relative to said static separator (2) and said static separator (2) comprising an outer housing (11); a de-agglomeration cone (5) and a first inverted frustum cone (6), said de-agglomeration cone [5] arranged adjacent to said first inverted frustum cone (6) by holding rods (18), said holding rods (18) are connected to said inverted first frustum of cone (6).

10 Claims, 5 Drawing Sheets

(Section A-A)

(51) Int. Cl.
   *B07B 7/04*   (2006.01)
   *B07B 7/10*   (2006.01)
(58) Field of Classification Search
   CPC ........ B01D 45/02; B01D 45/04; B01D 45/06;
   B01D 45/08; B01D 45/10; B01D 45/12;
   B01D 45/14; B01D 45/16; B01D 45/18
   USPC ........................................................ 209/133
   See application file for complete search history.

(56) References Cited

FOREIGN PATENT DOCUMENTS

| | | | | | |
|---|---|---|---|---|---|
| DE | 601883 | C | * | 6/1932 | |
| DE | 601883 | C | * | 8/1934 | |
| DE | 601883 | C | | 8/1934 | |
| DE | 102006039775 | | * | 2/2008 | |
| DE | 102006039775 | A1 | * | 2/2008 | ............. B02C 23/12 |
| WO | WO-2008022778 | A2 | * | 2/2008 | ............. B02C 23/12 |

* cited by examiner

Figure 1

Figure 2 (Section E-E)

Figure 3 (Section A-A)

Figure 4 (Section B-B)

INTEGRATED SEPARATOR

FIELD OF THE INVENTION

This invention relates to an apparatus and method for integrated separators in cement plants.

BACKGROUND OF THE INVENTION

In cement industries, separators are used to separate coarse and fine particles from the feed material. Based on working principle separators are majorly classified as static and dynamic separators. As the name of the separator implies, the static separator is made up of non-movable parts and the dynamic separator comprises internal moving parts. There are two major areas where the separators are used in cement plants; first one is in the raw grinding area and the other one is at the finish grinding area. In both cases the overall layout height of the cement plant where the separators are arranged is highly cost consuming, due to high construction costs.

Therefore, it would be advantageous to be able to apply a separator which will lower the height of the cement plant where the separators are arranged, thus lowering the constructions cost of the cement plant.

OBJECT OF THE INVENTION

It is an object of the present invention to overcome or at least alleviate one or more of the above problems of the prior art and/or provide the consumer with a useful or commercial choice.

It is an object of the present invention to provide a method for lowering the height of the cement plant where the separators are arranged, thus lowering the constructions cost of the cement plant.

It is another object of the present invention to provide a separator which will lower the height of the cement plant where the separators are arranged, thus lowering the constructions cost of the cement plant.

It is a further object of the present invention to provide an alternative to the prior art.

SUMMARY OF THE INVENTION

In a first aspect, the invention relates to an integrated separator for separating coarse and fine particles in a cement making process, the integrated separator comprising
a static separator
a dynamic separator, the dynamic separator being arranged in an uppermost position relative to said static separator and
the static separator comprising an outer housing, a de-agglomeration cone and a first inverted frustum cone, the de-agglomeration cone being arranged adjacent to the first inverted frustum cone by holding rods, the holding rods are connected to said inverted first frustum of cone and outer casing.

The compact layout of the integrated separator according to the present invention, contributes to the minimization of the cement plant construction cost, by reducing the building height. The existing models of both static and dynamic separators are not compact, as long as the separators are not compact, the total layout will not be compact. A compact separator according to the present invention will minimize the building height of the cement plant and will not compromise on the efficiency of the separator. It is not only the size of the separators but also the unwanted ducts in between two separators and conveying ducts which make the building higher. In those cases, there is a need to avoid/cut-short the length and/or height of the conveying ducts. Moreover, by combining both static and dynamic separator will bring more benefits in terms of compact layout.

The integrated separator according to present invention, may further comprise a reject chute configured for extracting coarse particles from the static separator and a main air supply duct configured for supplying external air to the static separator.

The integrated separator may further comprise feeding chutes arranged on the static separator and two or more inverted frustum cones. The first inverted frustum cone may have a diameter larger than diameter of second inverted frustum cone. The second inverted frustum cone may have a diameter larger than diameter of third inverted frustum cone. The third inverted frustum cone may have a diameter larger than diameter of fourth inverted frustum cone.

The outer housing is preferably connected to the inverted frustum of cones by means of holding rods across a cross section. The outer housing is preferably proximal to the position of the de-agglomeration cone and may have a smaller diameter than the diameter of the outer housing distal to the position of the de-agglomeration cone.

The inverted frustum of cone is preferably arranged in a position by rods which are attached to the outer housing.

The dynamic separator may further comprise a static vane configured for "both in-line and parallel arrangement", a roto configured for both in-line and parallel arrangement, a reject cone configured for both in-line and parallel arrangement, a reject chute configured for both in-line and parallel arrangement and an output chute configured for both in-line and parallel arrangement.

The inverted frustum of cones, the reject chute, and the deagglomeration cone may be arranged concentrically one above the other at a specific interval. The interval may be in the range of 10% to 55% of total height of larger diameter frustum of cone in each set of cones.

The feed chutes may be arranged at an upper most position relative to the deagglomeration cone through which coarse and fine particles enters a static separator zone, "for both in-line and parallel arrangement", the air goes through the main air supply duct, the main air supply duct may be attached to the outer housing at bottom "for In-line arrangement", the main air supply duct may be attached to the outer housing at top "for parallel arrangement".

During separation of the particles in the static separation zone, the fine particles may be passed away by air supplied through the main air supply duct, and the inverted frustums of cones are preferably arranged concentrically so an annular gap may act as a fine particle carrying passage.

A cement plant preferably comprises an integrated separator according to any of the embodiments mentioned above.

In a second aspect, the invention relates to a method for separating coarse and fine particles in a cement making process, the method may utilize any of the integrated separators mentioned above.

The first and second aspects of the present invention may be combined.

In the present context, a number of terms are used in a manner being ordinary to the skilled person. Some of these terms are detailed below:

De-agglomeration cone is preferably used to mean/denote a cone used to de-agglomerate the feed material, before it enters the separation zone of the static separator.

Inverted frustum cone is preferably used to mean/denote a wall of each frustum of cone acting as a deflector for the air which enters through the main air inlet duct for both in-line and parallel arrangement.

BRIEF DESCRIPTION OF THE FIGURES

The figures show one way of implementing the present invention and is not to be construed as being limiting to other possible embodiments falling within the scope of the attached claim set.

Embodiments of the invention, by way of example only, will be described with reference to the accompanying figures in which.

DETAILED DESCRIPTION OF THE INVENTION

Figure 1:
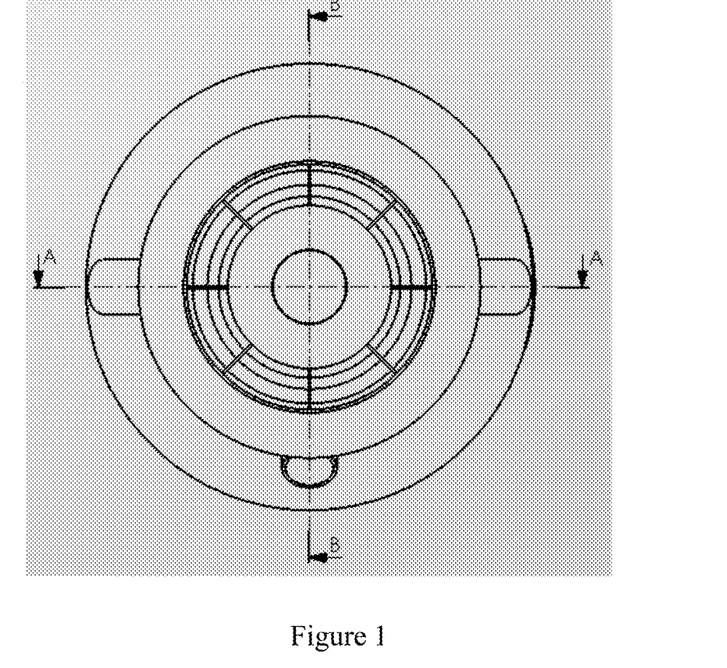
FIG. 1 schematically illustrates an integrated separator according to the present invention, from a top view.

FIG. 1 schematically illustrates an integrated separator according to present invention from a top view, which illustrates the feed chute, reject chute and outer housing with holding rods used to hold the frustum of cones.

Figure 2:
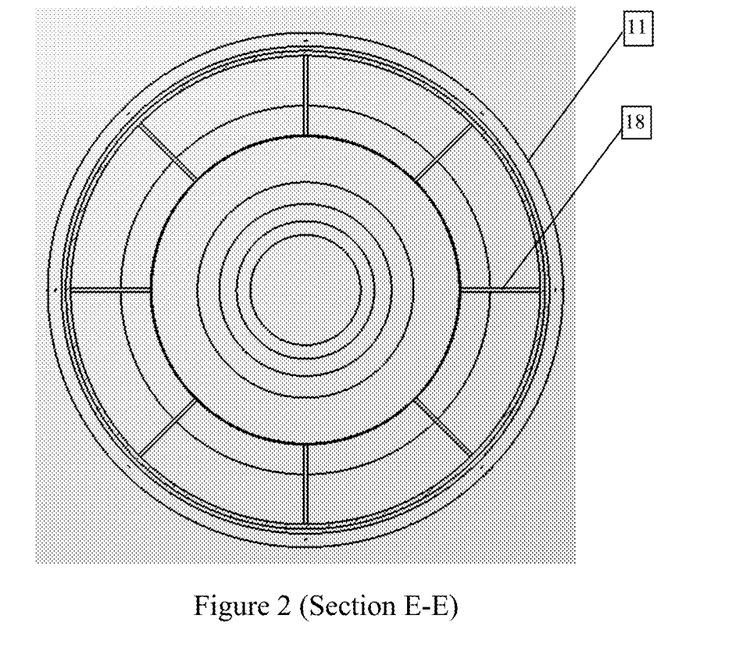
FIG. 2 schematically illustrates an integrated separator according to the present invention.

FIG. 2 schematically illustrates the frustum of cone according to the present invention from a top view, and how the frustum of cones are being held at their position by holding rods.

Figure 3:
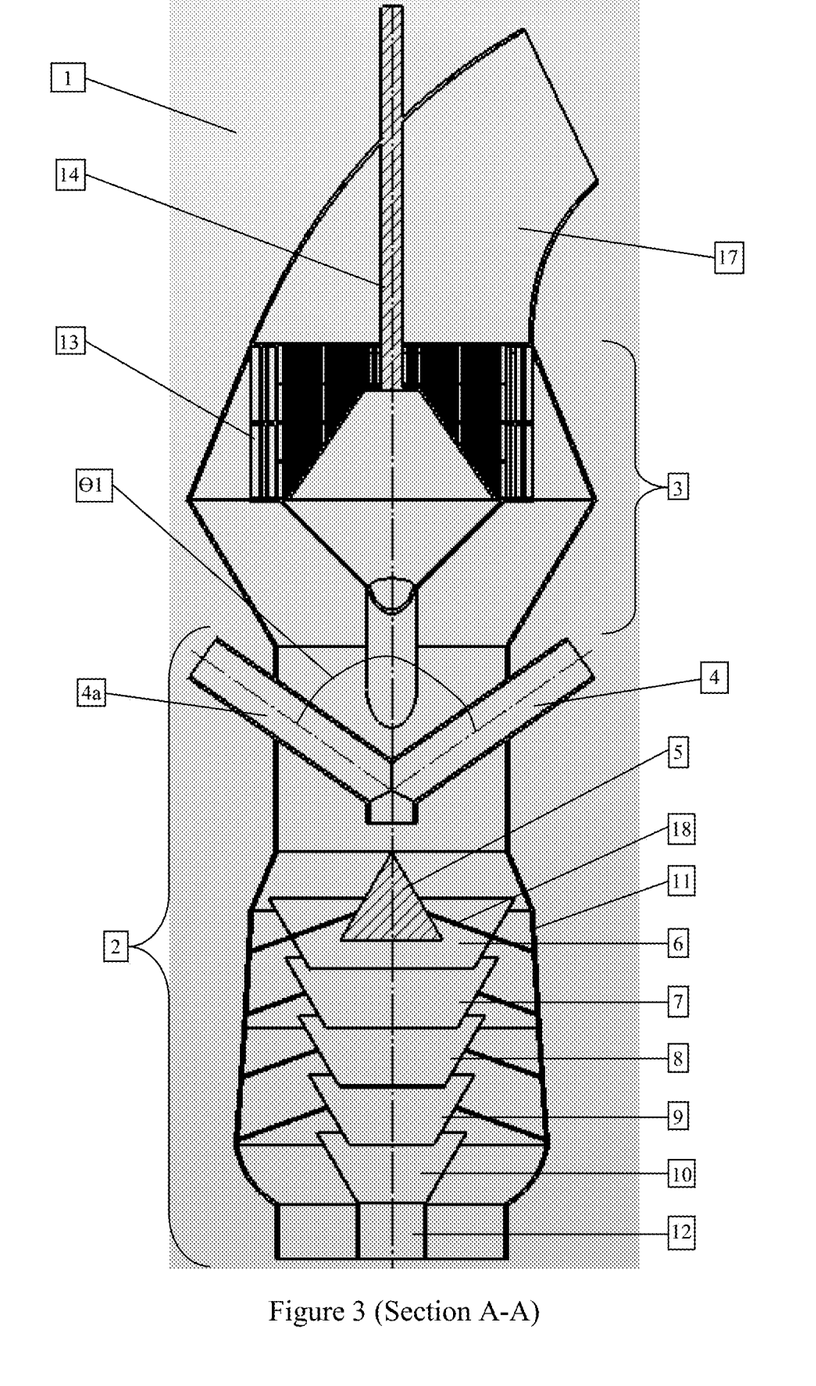
FIG. 3 schematically illustrates an integrated separator according to the present invention, from a side view.

FIG. 3 schematically illustrates an integrated separator 1 for separating coarse and fine particles in a cement making process. The integrated separator 1 comprises:

a static separator 2 a dynamic separator 3, the dynamic separator 3 being arranged in an uppermost position relative to the static separator 2, and the static separator 2 comprises an outer housing 11, a de-agglomeration cone 5 and a first inverted frustum cone 6. The de-agglomeration cone 5 is arranged adjacent to the first inverted frustum cone 6 by holding rods 18. The holding rods 18 are connected to the inverted first frustum of cone 6.

The integrated separator 1 further comprises a reject chute 12, as illustrated in FIG. 3. The reject chute 12 is configured for extracting coarse particles from the static separator 2. The integrated separator 1 further comprises a main air supply duct 16 configured for supplying external air to the static separator.

As shown in FIG. 3, the integrated separator 1 further comprises feeding chutes 4, 4a arranged on the static separator 2 and two or more inverted frustum cones 6, 7, 8, 9, 10. The inverted frustum cone 6 has a diameter larger than diameter of inverted frustum cone 7, the inverted frustum cone 7 has a diameter larger than diameter of inverted frustum cone 8 and the inverted frustum cone 8 has a diameter larger than diameter of inverted frustum cone 9 and the inverted frustum cone 9 has a diameter larger than diameter of inverted frustum cone 10. This configuration of the frustum cones, with a larger diameter kept at the top to provide a passage for fine particles to escape through the annular gap.

The outer housing 11 is connected to the inverted frustum of cones 6, 7, 8, 9, 10 by means of holding rods 18 across a cross section. The outer housing 11 proximal to the position of the de-agglomeration cone 5 has a smaller diameter than the diameter of the outer housing 11 distal to the position of the de-agglomeration cone 5. This configuration ensures enough annular space given for fine particles to escape from static separator to dynamic separator.

As illustrated in FIG. 3, the inverted frustum cones 6, 7, 8, 9, 10 are arranged in a position by holding rods 18 which are attached to the outer housing 11.

The de-agglomeration cone 5 helps to break all the lumps/big size cake in to smaller pieces before it enters the separating zone, hence the static separator will no longer struggle with larger size feed materials.

The dynamic separator 3 further comprises a static vane 13 configured for "both in-line and parallel arrangement", a rotor 14 configured for both in-line and parallel arrangement, a reject cone 15 configured for both in-line and parallel arrangement, a reject chute 12 configured for both in-line and parallel arrangement and an output chute 17 configured for both in-line and parallel arrangement.

Figure 4:
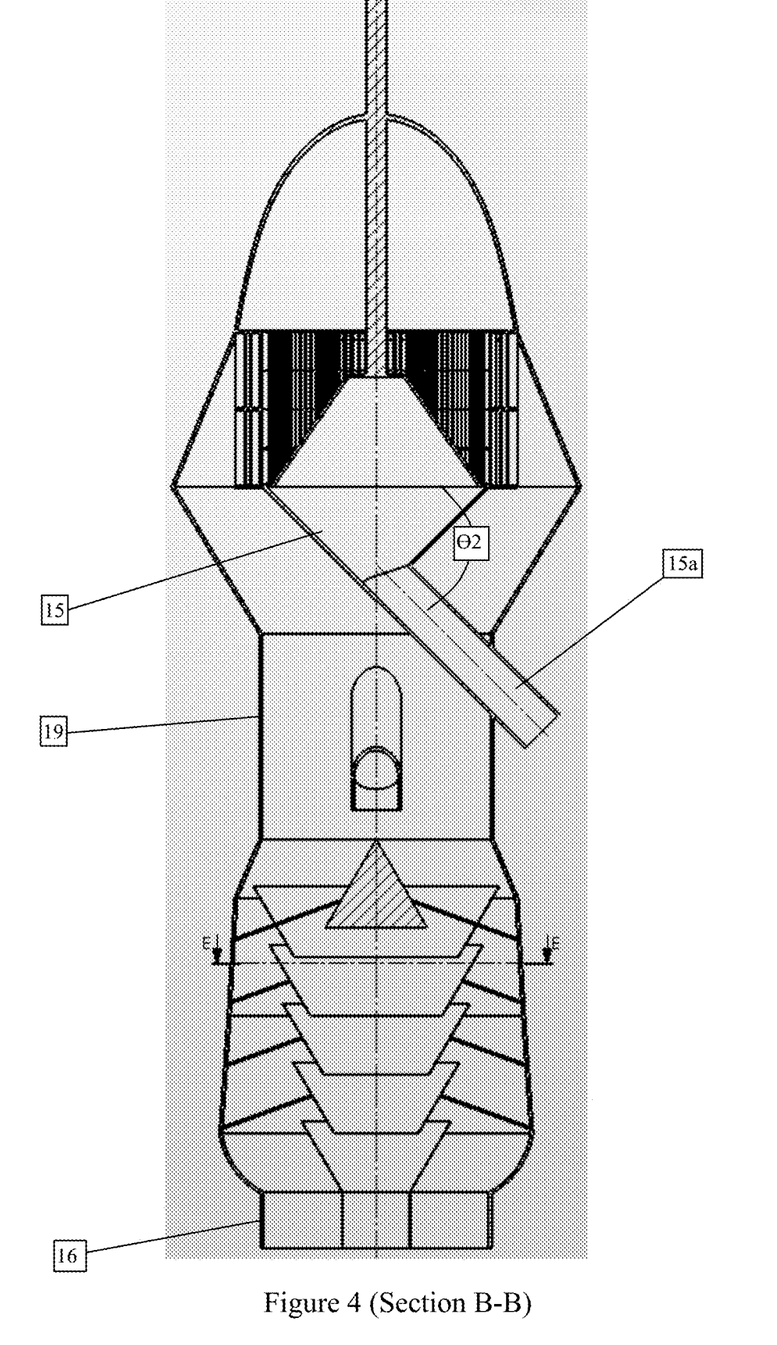
FIG. 4 schematically illustrates an integrated separator according to the present invention, with a reject chute arranged on the dynamic separator.

FIG. 4 illustrates another embodiment of the integrated separator according to present invention. In the embodiment shown in FIG. 4, the integrated separator comprises a reject chute 15a. FIG. 3 and FIG. 4 show the differences in cross-section of the integrated separator (in-line arrangement) which is 90 degrees to each other.

Common to the embodiments of the integrated separate disclosed in FIGS. 3 and 4, is that they are disclosing an embodiment of the integrated separator from now on referred to as configuration_1.

Figure 5:
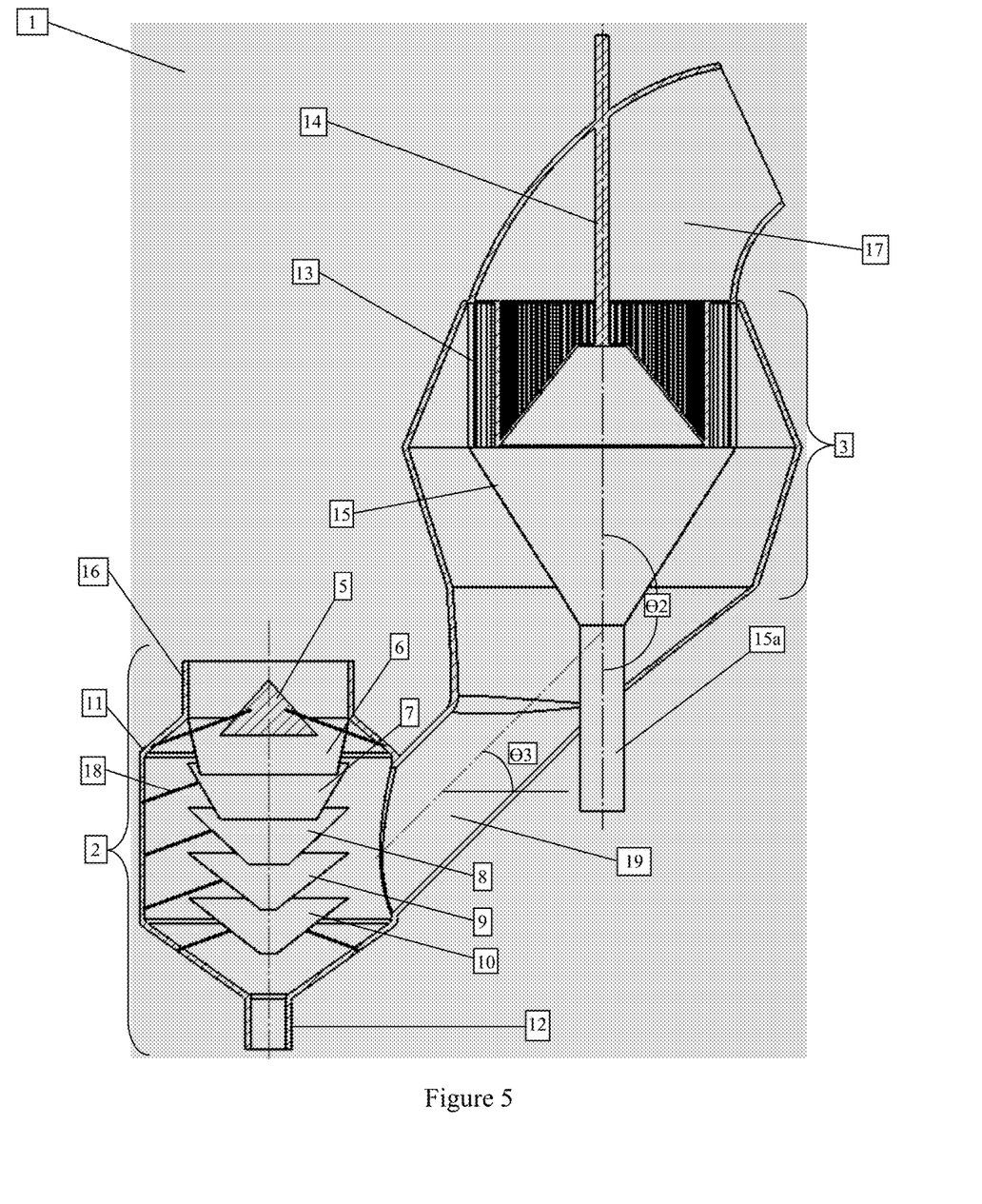
FIG. 5 schematically illustrates an alternative setup for the integrated separator, according to the present invention (configuration 2-parallel arrangement).

FIG. 5 schematically illustrated another embodiment of the integrated separator according to the present invention, from now on referred to as configuration_2.

Unlike configuration-1 (In-line arrangement), configuration-2 (Parallel arrangement) has static and dynamic separator in different axis but in both configurations dynamic separator kept above the static separator height For the two configurations, In-line (also referred to as configuration_1) and parallel arrangement (also referred to as configuration_2), air enters through the air inlet duct 16 (in the case of both configurations 1 & 2) and in configuration_1, feed material from HRP and ball mill enter through feed chutes 4 and 4a respectively. In configuration_2, feed material enters through air inlet duct 16 along with air after that in both configurations 1 & 2, as the feed material hits the de-agglomeration cone 5 de-agglomeration takes place. After de-agglomeration, material continues to fall. At the same time, air gets diverted by the inclined faces of concentrically arranged frustum of cones 6, 7, 8, 9, 10. In configuration_1, as the air enters the centre of each cone after passing through the annular gap, separation process takes place and rejected material continues to fall through the reject chute 12 and in the case of configuration_2 the air gets diverted by the inclined faces of frustum of cones and fine particles are being carried away by the air which passes through the gap between each set of frustum of cones. In case of Configuration_1 fine particles are being carried away by the air which passes through the annular gap between an outer casing 11 and the first frustum of cone 6; further these fine particles are being carried up to dynamic separator 3 through connecting chute 19 which is being kept straight in configuration_1 and inclined at an angle of θ3 in the configuration_2 and there in dynamic separator 3 these fine particles gets separated further (in both configurations 1 & 2). In both configurations 1 & 2, as the fine particles from static separator 2 enters in to the dynamic separator 3, air pushes the particles through the static vanes 13 after that finer particles passes through the rotor 14 and gets collected from fine chute 17, coarse particles get rejected and fall into the reject cone 15 and collected from reject chute 15a (in configuration_2 angle θ2 may be 180 or less).

Referring back to FIG. 3, the inverted frustum cones 6, 7, 8, 9, 10, the reject chute 12, and the deagglomeration cone 5 are arranged concentrically one above the other at a specific interval. The interval is in the range of 10% to 55% of height of the upper frustum of cone of each set of cones The feed chutes 4, 4a are arranged at an upper most position relative to the deagglomeration cone 5 through which coarse and fine particles enters a static separator zone, "for both in-line and parallel arrangement". The air goes through the main air supply duct 16. The main air supply duct is attached to the outer housing 11 at bottom "for In-line arrangement". The main air supply duct is attached to said outer housing 11 at top "for parallel arrangement"

During separation of the particles in the static separation zone, the fine particles are passed away by air supplied through the main air supply duct 16, and the inverted frustums of cones 6, 7, 8, 9, 10 are arranged concentrically so an annular gap acts as a fine particle carrying passage.

FIG. 5 schematically illustrates the configuration_2 embodiment of the integrated separator according to the present invention.

The integrated separator according to the present invention is a combination of a static and a dynamic separator. The integrated separator is preferably arranged after the HRP presser in a cement plant, and more preferably between the HRP and the ball mill.

Feed material from the HRP enters the feed chute 4 and the rejected feed from the ball mill enters via feed chute 4a. The air is supplied trough the main air supply duct 16 from fans. Coarse particles fall down through the reject chute 12 and go to HRP for regrinding. The finer particles pass through the rotor 14 and gets collected from fine chute 17.

Figure 6:
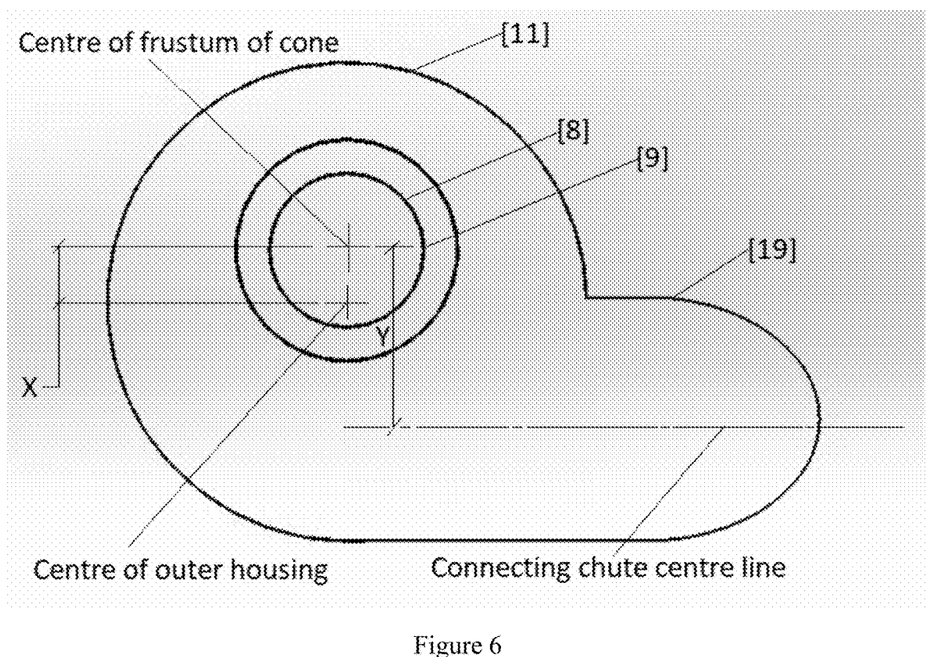
FIG. 6 schematically illustrates yet another alternative setup for the integrated separator, according to the present invention (configuration 2-parallel arrangement).

FIG. 6 schematically illustrates another alternative setup for the integrated separator, according to the present invention (configuration 2-parallel arrangement). On FIG. 6 the outer housing 11 is kept either concentrically or non-concentrically. The distance "X" is measured in between the center of the inverted frustum of cones 6-10 and center of the outer housing 11 as depicted in the FIG. 4. The connecting chute 19 protruding from static separator 2 is kept at a distance of "Y" as shown in FIG. 1; the distance "Y' can be zero as well.

A cement plant comprises an integrated separator according to any of the embodiments mentioned above.

A method for separating coarse and fine particles in a cement making process, the method utilizing an integrated separator according to any of the embodiments mentioned above.

Although the present invention has been described in connection with the specified embodiments, it should not be construed as being in any way limited to the presented examples. It should also be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

LIST OF REFERENCES

1: Integrated Separator
2: Static separator
3: Dynamic separator
4: Feed chute_1
4a: Feed chute_2
5: De-agglomeration cone
6: 1st Frustum of cone
7: 2nd Frustum of cone
8: 3rd Frustum of cone
9: 4th Frustum of cone
10: 5th Frustum of cone
11: Outer housing
12: Reject chute
13: Static vanes
14: Rotor
15: Reject cone
15a: Reject chute
16: Air inlet duct
17: Output chute
18: Holding rod
19: Connecting chute
θ1: Angle between feed chute 4 & 4a
θ2: Angle between reject cone 15 & reject chute 15a
θ3: Angle between connecting chute 19 & horizontal plane

What is claimed:

1. An integrated separator (1) for separating coarse and fine particles in a cement making process, said integrated separator (1) comprising:
   a static separator (2); and
   a dynamic separator (3), said dynamic separator (3) being arranged in an uppermost position relative to said static separator (2), said static separator (2) comprising:
   an outer housing (11);
   a de-aglomeration cone (5); and
   a plurality of inverted frustum cones (6, 7, 8, 9, 10) comprising a first inverted frustum cone (6), and a second inverted frustum cone (7);
   wherein said de-agglomeration cone (5) is arranged adjacent to said first inverted frustum cone (6) by first holding rods (18) connected to and extending between the de-agglomeration cone (5) and the outer housing (11),
   wherein said second inverted frustum cone (7) is arranged below said first inverted frustum cone (6) by second holding rods (18) connected to and extending between the second inverted frustum cone (7) and said outer housing (11).

2. The integrated separator (1) according to claim 1, further comprising a reject chute (12) configured for extracting coarse particles from said static separator (2) and a main air supply duct (16) configured for supplying air to said static separator.

3. The integrated separator (1) according to claim 1, further comprising feeding chutes (4, 4a) arranged on said static separator (2) and said plurality of inverted frustum cones (6, 7, 8, 9, 10) further comprising:
   a third inverted frustum cone (8), said first inverted frustum cone (6) having a maximum diameter which is larger than a maximum diameter of said second inverted frustum cone (7), and said maximum diameter of said second inverted frustum cone (7) being larger than a maximum diameter of said third inverted frustum cone (8).

4. The integrated separator (1) according to claim 1, wherein a portion of said outer housing (11) proximal to the position of said de-agglomeration cone (5), has a smaller diameter than a portion of the outer housing (11) which is distal to the position of said de-agglomeration cone (5).

5. The integrated separator (1) according to claim 1, wherein said dynamic separator (3) further comprises a static vane (13) configured for both in-line and parallel arrangement, a rotor (14) configured for both in-line and parallel arrangement, a reject cone (15) configured for both in-line and parallel arrangement, a reject chute (12) configured for both in-line and parallel arrangement and an output chute (17) configured for both in-line and parallel arrangement.

6. The integrated separator (1) according to claim 5, wherein said inverted frustum cones (6, 7, 8, 9, 10), said reject chute (12), and said deagglomeration cone (5) are arranged concentrically one above the other.

7. The integrated separator (1) according to claim 2, further comprising feed chutes (4, 4a) arranged at an upper most position relative to the deagglomeration cone (5) through which coarse and fine particles enters a static separator zone, wherein for both in-line and parallel arrangement, said air goes through said main air supply duct (16), said main air supply duct (16) being attached to said outer housing (11) at its bottom for in-line arrangement, said main air supply duct (16) being attached to said outer housing (11) at its top for parallel arrangement.

8. The integrated separator (1) according to claim 2, wherein during separation of coarse and fine particles in a static separation zone, said fine particles are passed away by said air supplied through said main air supply duct (16), and wherein said inverted frustrum cones (6, 7, 8, 9, 10) are arranged concentrically so an annular gap acts as a fine particle carrying passage.

9. A cement plant, comprising the integrated separator (1) according to claim 1.

10. An integrated separator (1) for separating coarse and fine particles in a cement making process, said integrated separator (1) comprising:
a static separator (2); and
a dynamic separator (3), said dynamic separator (3) being arranged in an uppermost position relative to said static separator (2), said static separator (2) comprising:
an outer housing (11);
a de-agglomeration cone (5); and
a plurality of inverted frustum cones (6, 7, 8, 9, 10) comprising a first inverted frustum cone (6) arranged in an uppermost position within the plurality of inverted frustum cones (6, 7, 8, 9, 10),
wherein said de-agglomeration cone (5) is arranged such that an upper portion of said de-agglomeration cone (5) is located above an upper portion of said first inverted frustum cone (6).

* * * * *